(12) United States Patent
Patil et al.

(10) Patent No.: US 8,923,897 B2
(45) Date of Patent: Dec. 30, 2014

(54) METHODS AND APPARATUS FOR ADAPTIVE PAGING IN PEER-TO-PEER NETWORKS TO IMPROVE POWER EFFICIENCY AND SETUP LATENCIES

(75) Inventors: Shailesh Patil, Bridgewater, NJ (US); Hua Wang, Bridgewater, NJ (US); Xinzhou Wu, Monmouth Junction, NJ (US); Junyi Li, Chester, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 13/228,981

(22) Filed: Sep. 9, 2011

(65) Prior Publication Data

US 2013/0065625 A1    Mar. 14, 2013

(51) Int. Cl.
*H04W 68/00* (2009.01)
*H04W 8/00* (2009.01)
*H04W 84/18* (2009.01)

(52) U.S. Cl.
CPC .............. *H04W 68/00* (2013.01); *H04W 8/005* (2013.01); *H04W 84/18* (2013.01)
USPC ..... 455/458; 455/420; 455/422.1; 455/456.1; 455/509; 455/435.2; 370/324; 370/329; 370/341; 370/348; 370/459

(58) Field of Classification Search
CPC ...... H04W 68/00; H04W 84/18; H04W 8/005
USPC ............ 455/58, 412.2, 420, 421, 422.1, 434, 455/435.1–435.2, 436, 442, 450, 451, 515, 455/525, 455, 509; 370/324, 350, 329, 237, 370/328, 338, 341, 348, 432, 437, 459
See application file for complete search history.

(56) References Cited

U.S. PATENT DOCUMENTS

| 7,200,412 B2 | 4/2007 | Kim | |
| 2008/0081645 A1* | 4/2008 | Kim et al. | 455/458 |
| 2009/0010179 A1* | 1/2009 | Laroia et al. | 370/254 |

(Continued)

FOREIGN PATENT DOCUMENTS

| EP | 2023680 | 2/2009 |
| EP | 2247145 A1 | 11/2010 |

OTHER PUBLICATIONS

International Search Report and Written Opinion—PCT/US2012/054252—ISA/EPO—Nov. 5, 2012.

*Primary Examiner* — Babar Sarwar
(74) *Attorney, Agent, or Firm* — James K. O'Hare

(57) ABSTRACT

A method, a computer program product, and an apparatus are provided. The apparatus determines paging resources of a plurality of paging resources allocated for listening to paging messages. In addition, the apparatus transmits information indicating the allocated paging resources in a peer discovery signal. The apparatus may determine the paging resources on which to listen based on information received in peer discovery signals received from other wireless devices. The received information indicates the paging resources allocated to the other wireless devices.

40 Claims, 11 Drawing Sheets

(56) References Cited

U.S. PATENT DOCUMENTS

| | | |
|---|---|---|
| 2009/0010231 A1 | 1/2009 | Laroia et al. |
| 2009/0013081 A1* | 1/2009 | Laroia et al. ............ 709/228 |
| 2009/0129325 A1 | 5/2009 | Prakash et al. |
| 2010/0202400 A1 | 8/2010 | Richardson et al. |
| 2010/0240400 A1 | 9/2010 | Choi |
| 2010/0261487 A1 | 10/2010 | Razdan |
| 2010/0317374 A1 | 12/2010 | Alpert et al. |
| 2011/0244893 A1* | 10/2011 | Wang et al. ............ 455/458 |

* cited by examiner

METHODS AND APPARATUS FOR ADAPTIVE PAGING IN PEER-TO-PEER NETWORKS TO IMPROVE POWER EFFICIENCY AND SETUP LATENCIES

BACKGROUND

1. Field

The present disclosure relates generally to communication systems, and more particularly, to adaptive paging in peer-to-peer networks.

2. Background

In an ad hoc peer-to-peer wireless network, a wireless device may initiate communication with another wireless device by sending a page to the wireless device. The page may be transmitted on a paging channel that is specifically allocated for allowing wireless devices to page each other. The paging channel may occur periodically such as, for example, every one second. Some applications that require machine to machine communication may need access to more frequent paging channels, as they may require a connection setup and a tear down over smaller time scales than one second. Increasing the frequency of the paging channel increases the overhead needed for paging and the power consumption needed for listing on the paging channel. As such, a need exists for an adaptive paging method that is power efficient while reducing setup latencies.

SUMMARY

In an aspect of the disclosure, a method, a computer program product, and an apparatus are provided in which paging resources are determined of a plurality of paging resources allocated for listening to paging messages. In addition, information indicating the allocated paging resources is transmitted in a peer discovery signal.

DETAILED DESCRIPTION

Figure 1:
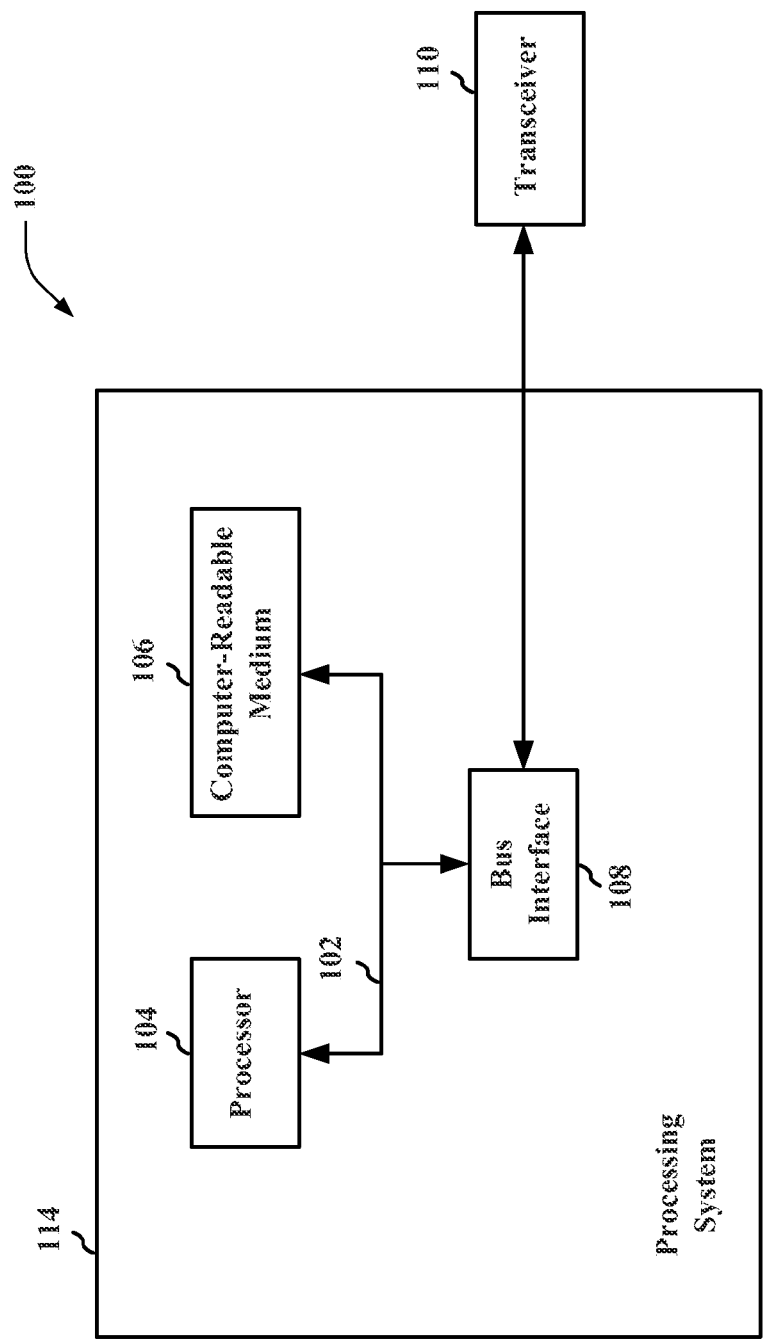
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EE-PROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
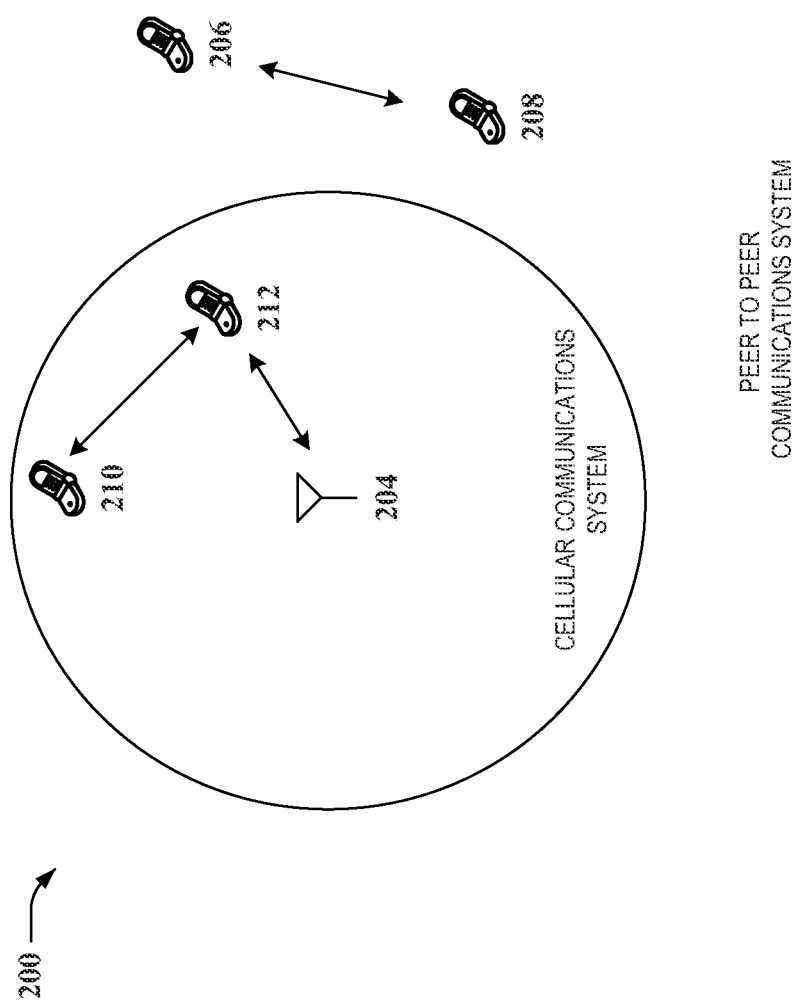
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
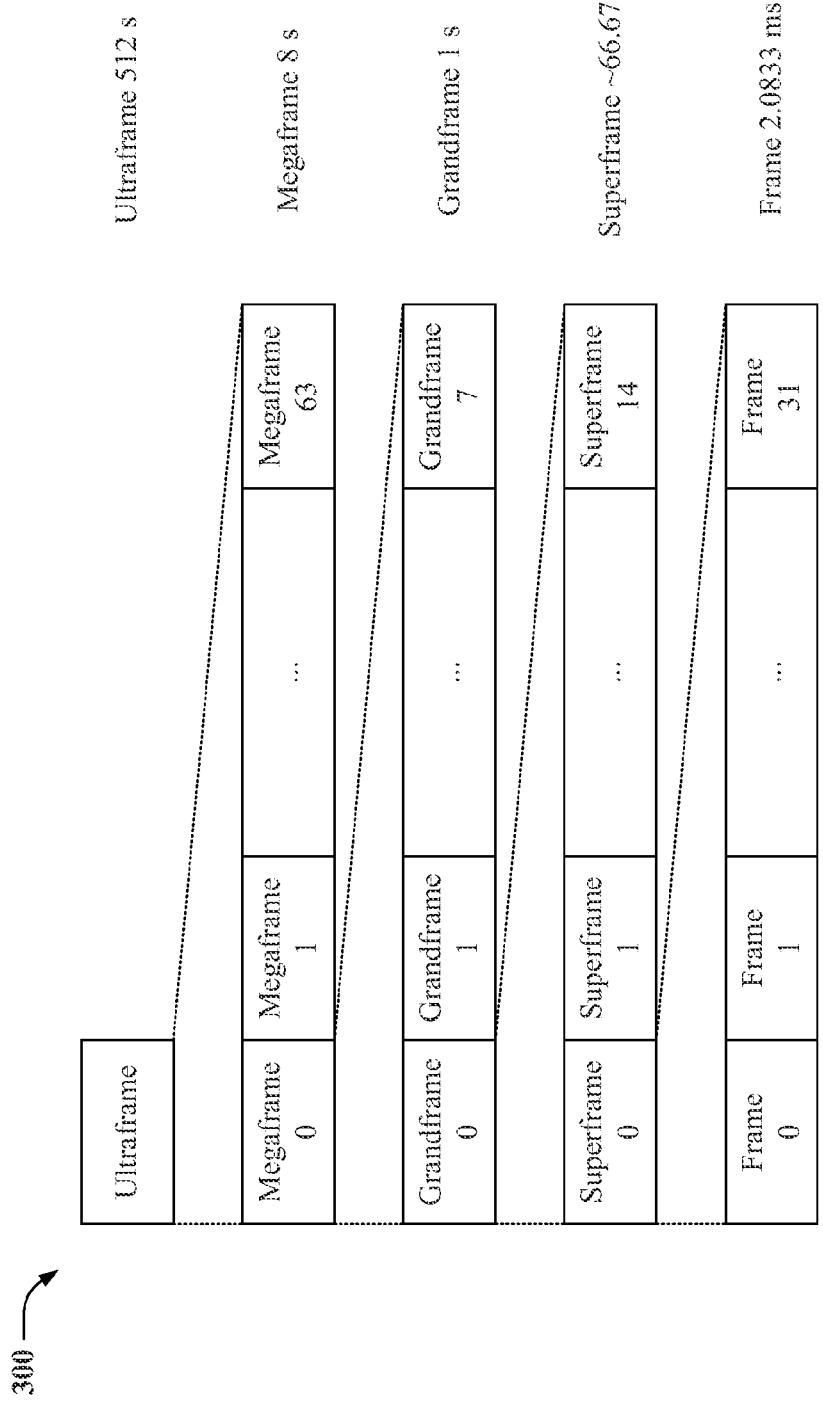
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
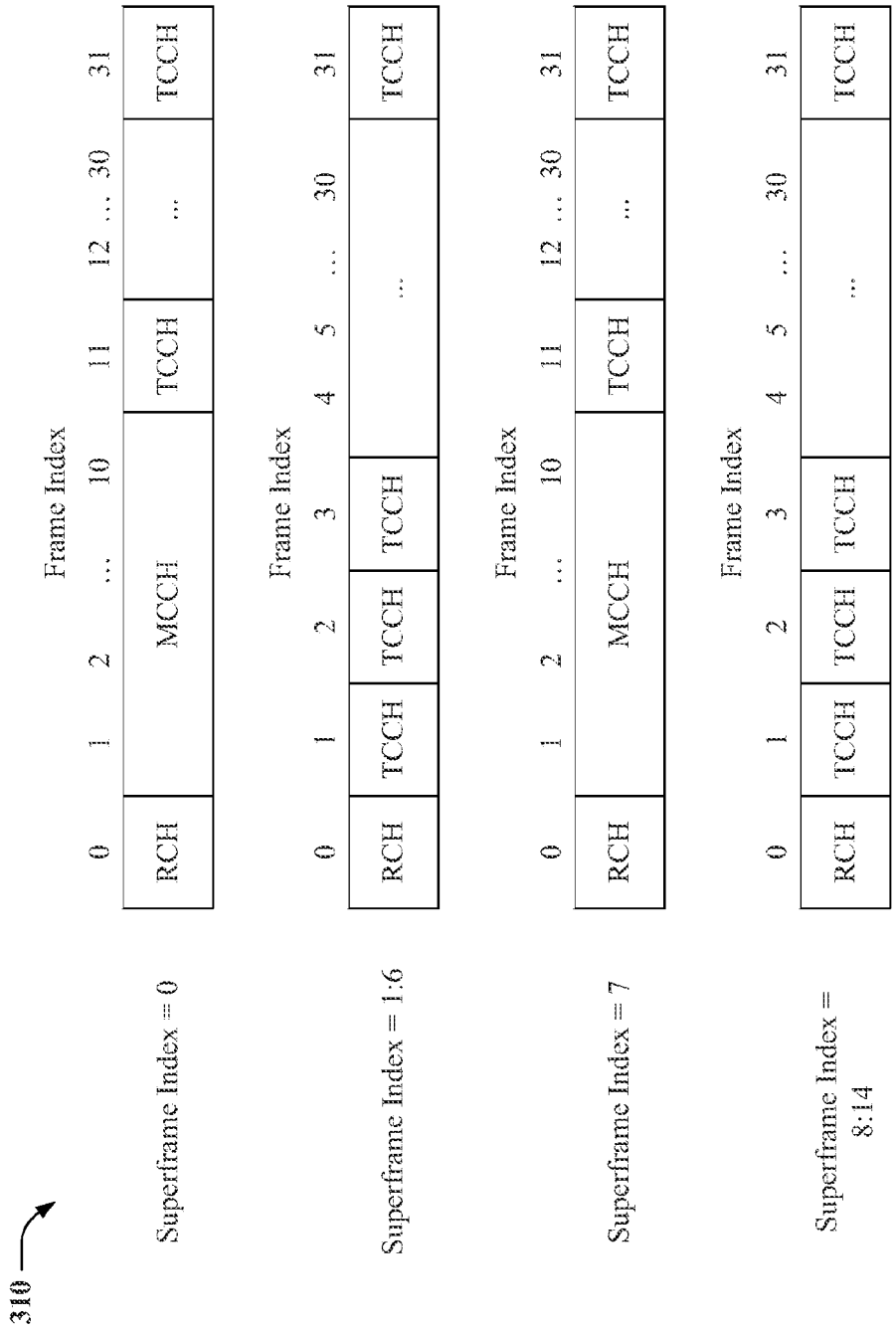
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
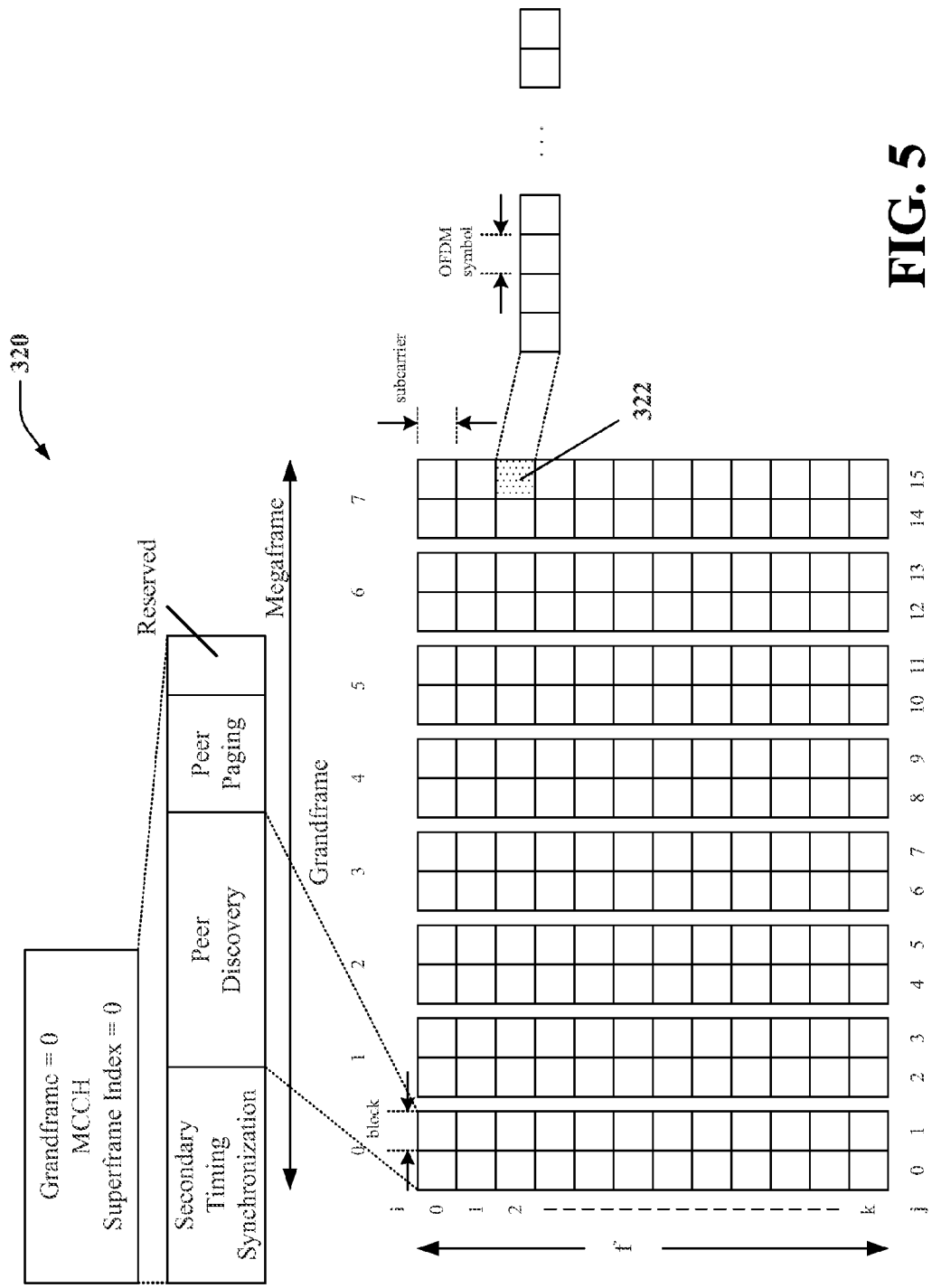
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding its PDRID and the detected energies on the other peer discovery resources corresponding to other PDRIDs.

Figure 6:
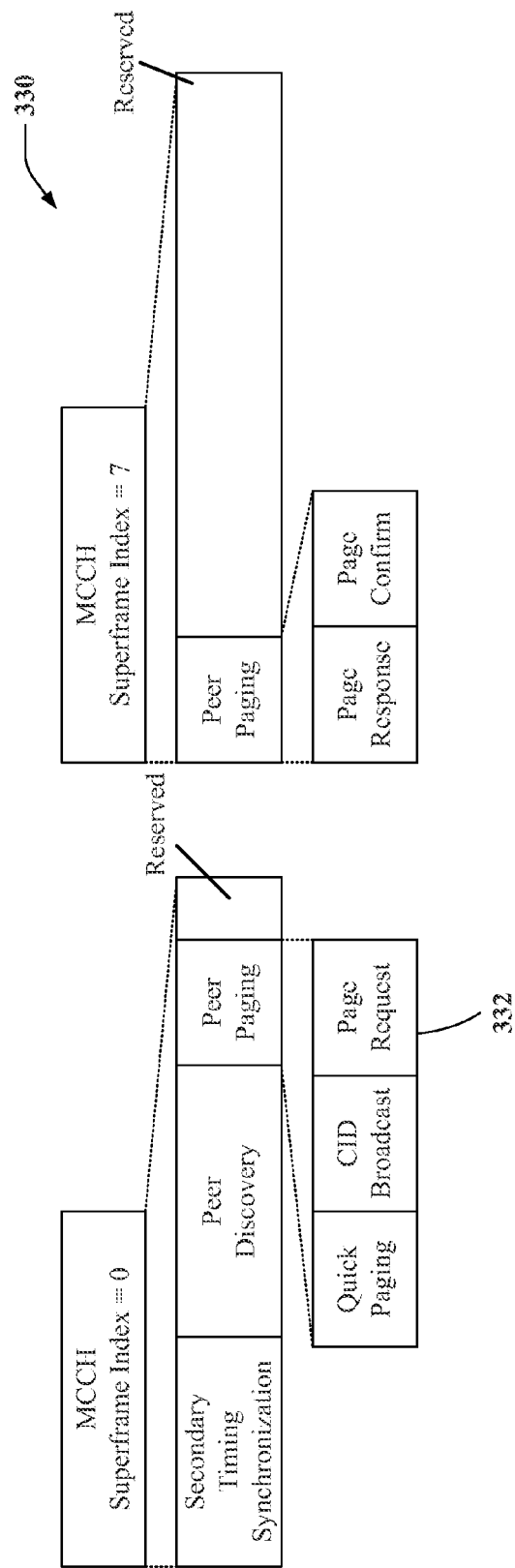
FIG. 6 is a diagram illustrating an operation timeline of a miscellaneous channel and peer paging channels.

FIG. 6 is a diagram 330 illustrating an operation timeline of the MCCH and peer paging channels. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel 332. The MCCH of superframe index 7 includes a peer paging channel and a reserved slot. The peer paging channel in the MCCH of superframe index 7 includes a page response channel and a page confirm channel.

Figure 7:
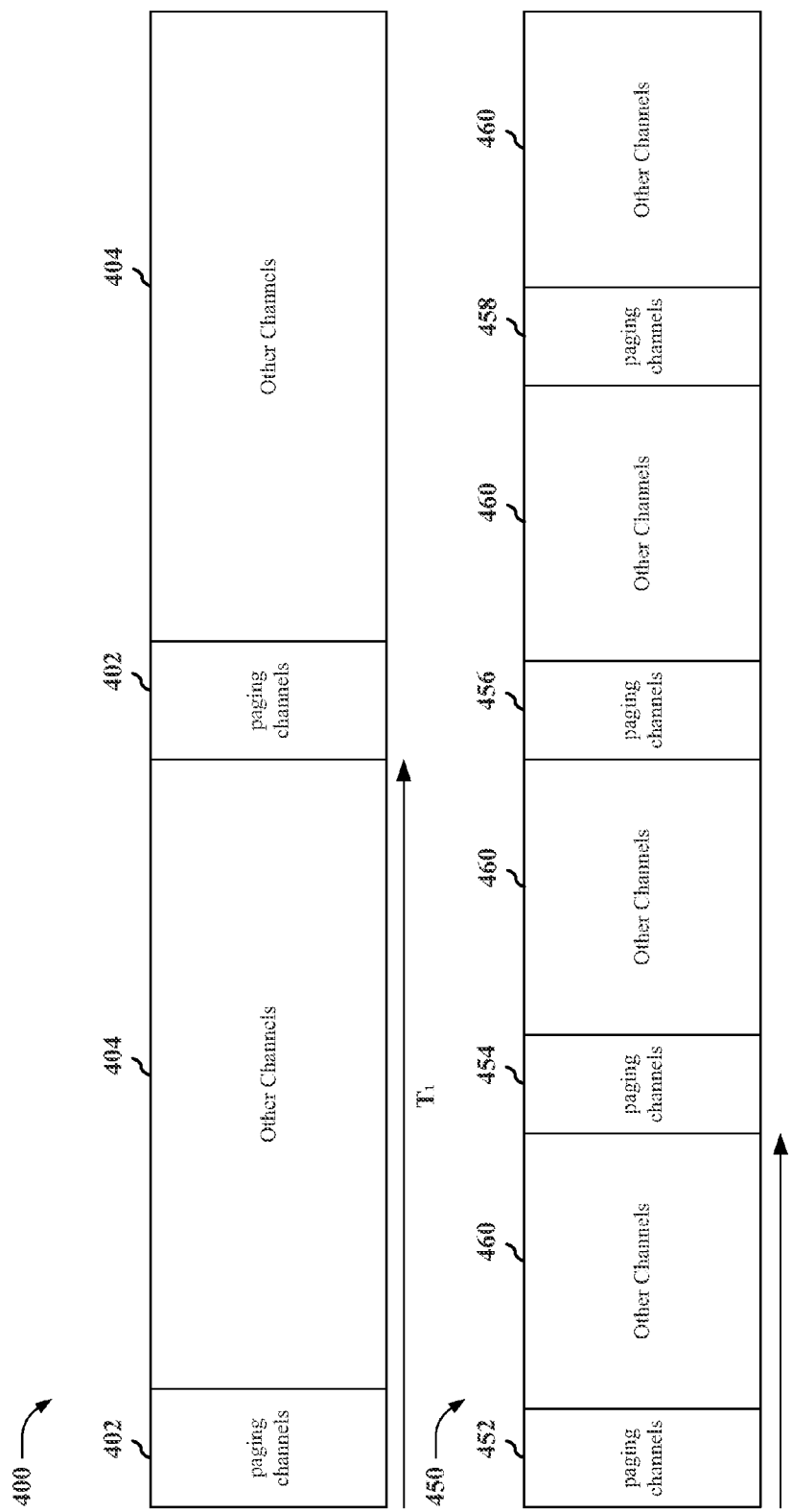
FIG. 7 is a first diagram for illustrating an exemplary method.

FIG. 7 is a first diagram for illustrating an exemplary method. As shown in the set of resources 400, the paging channels 402 may be allocated among other channels 404 with a period $T_1$. In FlashLinQ, $T_1$ is equal to one second, as paging occurs in each page request channel 332 that occurs once every grandframe. The latency of connection setup may be reduced by increasing the number of paging channels and spreading them across time. For example, as shown in the set of resources 450, the paging channels 452, 454, 456, 458 may be allocated among other channels 460 with a period $T_2$ less than $T_1$ (e.g., $T_2$ may be equal to 0.5 seconds). The set of resources 450 results in an increase in overhead needed for paging in the paging channels 452-458 and an increase in power consumption needed for listening to the paging channels 452-458. The increase in power consumption is equal to the increase in the number of paging channels. The issue related to the overhead may be addressed by reducing the amount of resources used for each paging channel. As such, the number of resources (e.g., number of resource elements) assigned to the paging channels 452-458 are less than the number of resources assigned to the paging channels 402. While reducing the number of resources for each paging channel can negate an increase in overhead, the reduction in the number of resources can deteriorate the performance of the paging channel by increasing false alarms and misdetections. Misdetections occur when a first wireless device transmits a page to a second wireless device, but the second wireless device does not detect the page. False alarms occur when a first wireless device does not transmit a page to a second wireless device, but the second wireless device detects a page. Less resources for paging increases both the rate of false alarms and the rate of misdetections.

According to an exemplary method, the increase in power consumption, false alarms, and misdetection due to a greater frequency of paging channels with less resources in each of the paging channels may be countered through an adaptive paging method. According to the exemplary adaptive paging method, a wireless device determines paging resources of a plurality of paging resources allocated for listening to paging messages and transmits information indicating the allocated paging resources in a peer discovery signal. The determined paging resources may be a subset of the paging resources on which the wireless device can listen. By listening on only a subset of the available paging resources, power consumption is reduced and, because the paging resources are less congested and wireless devices can use more of the paging resources for paging, the rate of false alarms and the rate of misdetections are reduced.

Figure 8:
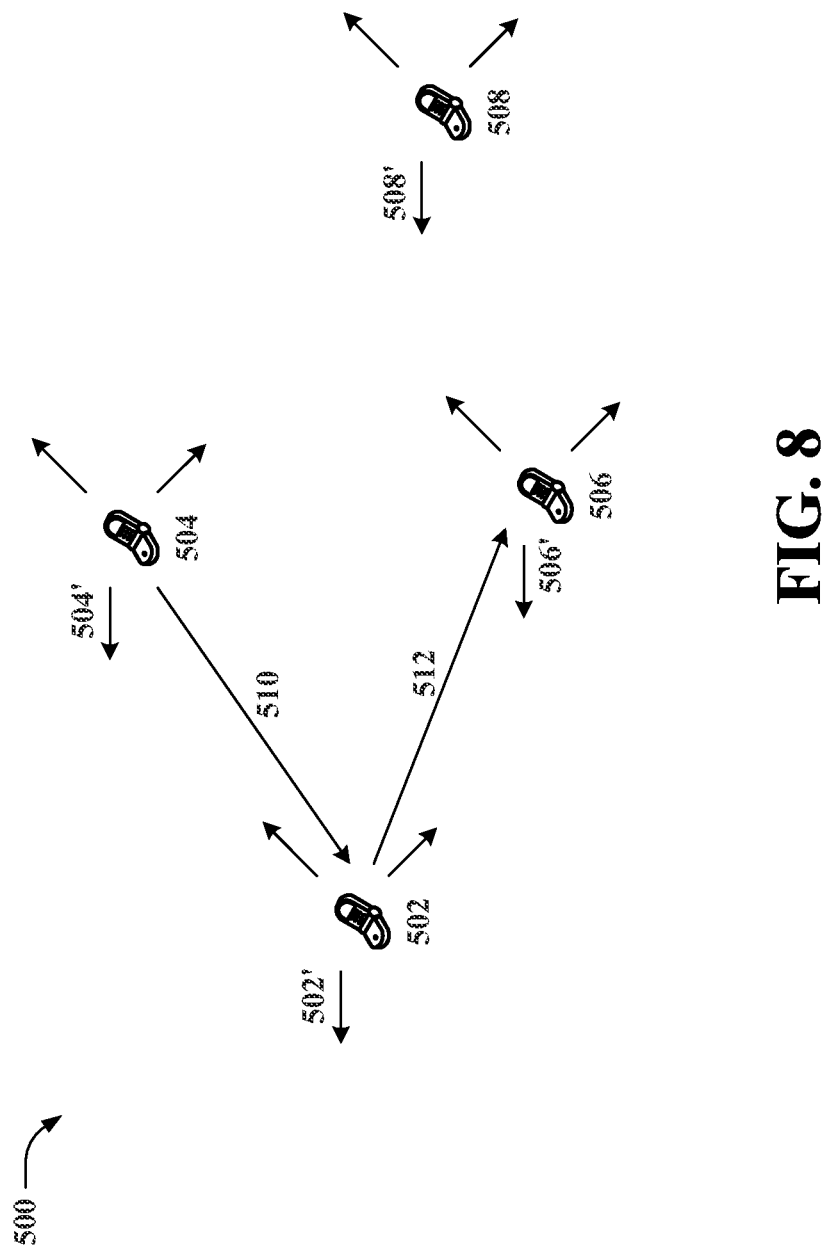
FIG. 8 is a second diagram for illustrating an exemplary method.

FIG. 8 is a second diagram 500 for illustrating an exemplary method. As shown in FIG. 8, the wireless devices 502, 504, 506, 508 each determine paging resources of a plurality of paging resources allocated for listening to paging messages and transmit information indicating the allocated paging resources in a peer discovery signal 502', 504', 506', 508', respectively. The plurality of paging resources include each paging channel of a set of periodic paging channels and the allocated paging resources are in a subset of the paging channels. For example, the plurality of paging resources may include each of the paging channels in the set of paging channels 452, 454, 456, 458 and, for the wireless device 502, the allocated paging resources may be within the paging channels 452, 456. As such, the wireless device 502 listens for pages on resources within the paging channels 452, 456 and does not listen for pages in the paging channels 454, 458, thereby listening in only half of the available paging channels.

Once the wireless device 502 determines the allocated paging resources, the wireless device 502 determines an offset and a periodicity of the allocated paging resources that defines which of the paging resources to which the wireless device 502 are allocated for listening to paging messages and transmits information indicating the offset and the periodicity. For example, with the allocated paging channels 452, 456, the periodicity would be $2T_2$, and assuming the paging channels 452 are a reference point, the offset would be 0. Based on the offset and the periodicity transmitted in the peer discovery signal 502', the wireless device 504 may transmit a page 510 to the wireless device 502. The wireless device 504 may determine the paging resources of the wireless device 502 directly through the received peer discovery signal 502', or alternatively, may receive information from a base station indicating the paging resources on which the wireless device 502 listens. In the latter configuration, the paging resources on which the wireless device 502 listens are determined by a base station that receives the peer discovery signal 502'.

Furthermore, the wireless device 502 may receive from the wireless device 506 the peer discovery signal 506', which includes information indicating paging resources to which the wireless device 506 are allocated for listening to paging messages. For example, the wireless device 506 may be allocated paging resources within the paging channels 454, 458 and therefore may transmit information indicating an offset of 1 and a periodicity of $2T_2$ in its peer discovery signal 506'. Based on the received information, the wireless device 502 may page 512 the wireless device 506 on resources corresponding to the paging resources allocated to the wireless device 506.

The wireless device 502 may determine the paging resources to which it is allocated based on the paging resources to which the wireless devices 504-508 are allocated. For example, the wireless device 502 may receive the peer discovery signals 504', 506', 508' and obtain information in each of the signals indicating the paging resources to which the wireless devices 504, 506, 508 are allocated. Based on the obtained information, the wireless device 502 may determine a load on each of the paging channels. Based on the determined load, the wireless device 502 may allocate its paging resources. For example, if the wireless device 504 is allocated paging resources within the paging channels 452, 454, 456, 458, the wireless device 506 is allocated paging resources within the paging channels 454, 458, and the wireless device is allocated paging resources within the paging channels 454, 458, the wireless device 502 may select paging resources within the paging channels 452, 456, assuming a periodicity of $2T_2$ is sufficient for the wireless device 502. By selecting the allocated paging resources based on the paging resources allocated to other wireless devices, the load on the paging resources may be better balanced, thereby reducing paging false alarms and misdetections.

Alternatively or in addition, the wireless device 502 may determine the allocated paging resources based on a traffic type of communication, a remaining battery power, whether the device is connected to an unlimited power source, and/or a state of the device relative to an environment of the device. A traffic type of machine-to-machine communication may require more frequency paging channels, whereas a traffic type of a file transfer may require less frequent paging channels. When the remaining battery power of the wireless device 502 is high and/or the wireless device 502 is connected to an unlimited power source, the paging resources to which the wireless device 502 are allocated may be increased, and when the remaining batter power of the wireless device 502 is low and/or the wireless device is not connected to an unlimited power source, the paging resources to which the wireless device 502 are allocated may be decreased. The state of the wireless device 502 relative to the environment of the wireless device 502 includes one or more of a velocity, a temperature, a location, acceleration, orientation, humidity, altitude, electromagnetic field, luminosity, audio waves, barometric pressure, pressure, or seismic activity of the wireless device 502. For example, a higher velocity may require a greater frequency of paging channels to allow for rapid vehicle-to-vehicle communication.

Figure 9:
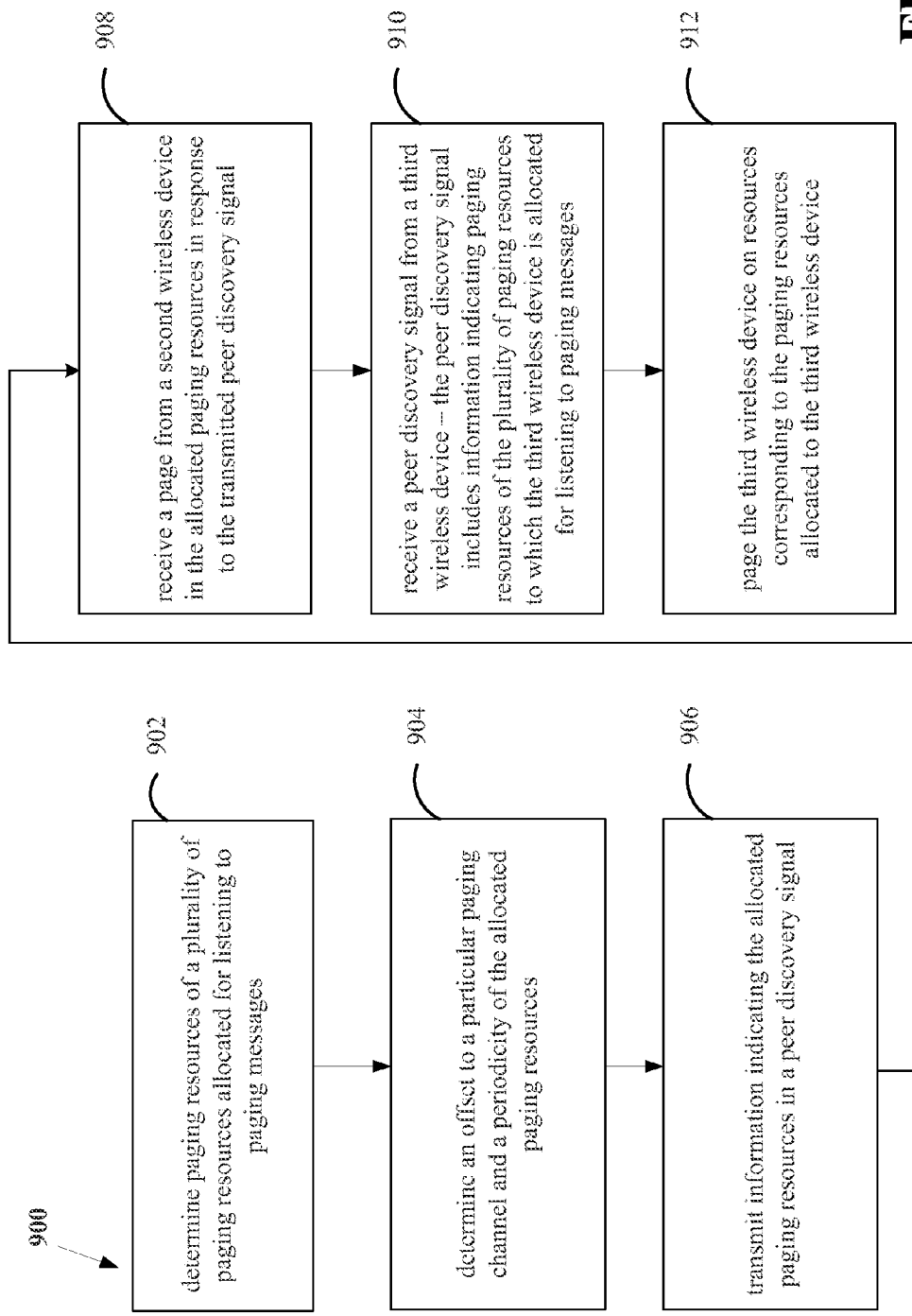
FIG. 9 is a flow chart of a method of wireless communication.

FIG. 9 is a flow chart 900 of a method of wireless communication. The method may be performed by a wireless device, such as the wireless device 502. As shown in FIG. 9, the wireless device 502 determines paging resources of a plurality of paging resources allocated for listening to paging messages (902) and transmits information indicating the allocated paging resources in a peer discovery signal (906). In one configuration, the plurality of paging resources include each paging channel of a set of periodic paging channels and the allocated paging resources are in a subset of the paging channels. In one configuration, the wireless device 502 determines an offset to a particular paging channel and a periodicity of the allocated paging resources (904). In such a configuration, the transmitted information (906) includes the offset and the periodicity. Rather than transmit periodicity and offset information, the wireless device 502 may transmit other information that conveys to other wireless devices the paging resources to which the wireless device 502 is allocated for listing to paging messages. The wireless device may also receive a page from a second wireless device in its allocated paging resources in response to the transmitted peer discovery signal (908). The wireless device 502 may also receive a peer discovery signal from a third wireless device in which the peer discovery signal includes information indicating paging resources of the plurality of paging resources to which the third wireless device are allocated for listening to paging messages (910). Based on the received information indicating the paging resources of the third wireless device, the wireless device 502 may page the third wireless device on resources corresponding to the paging resources allocated to the third wireless device (912).

As discussed supra, the wireless device 502 may determine the allocated paging resources (902) based on at least one of a traffic type of communication of the wireless device 502, a remaining battery power of the wireless device 502, whether the wireless device 502 is connected to an unlimited power source, or a state of the wireless device 502 relative to an environment of the wireless device 502. The state of the wireless device 502 relative to the environment of the wireless device 502 includes one or more of a velocity, a temperature, a location, acceleration, orientation, humidity, altitude, electromagnetic field, luminosity, audio waves, barometric pressure, pressure, or seismic activity of the wireless device 502.

Figure 10:
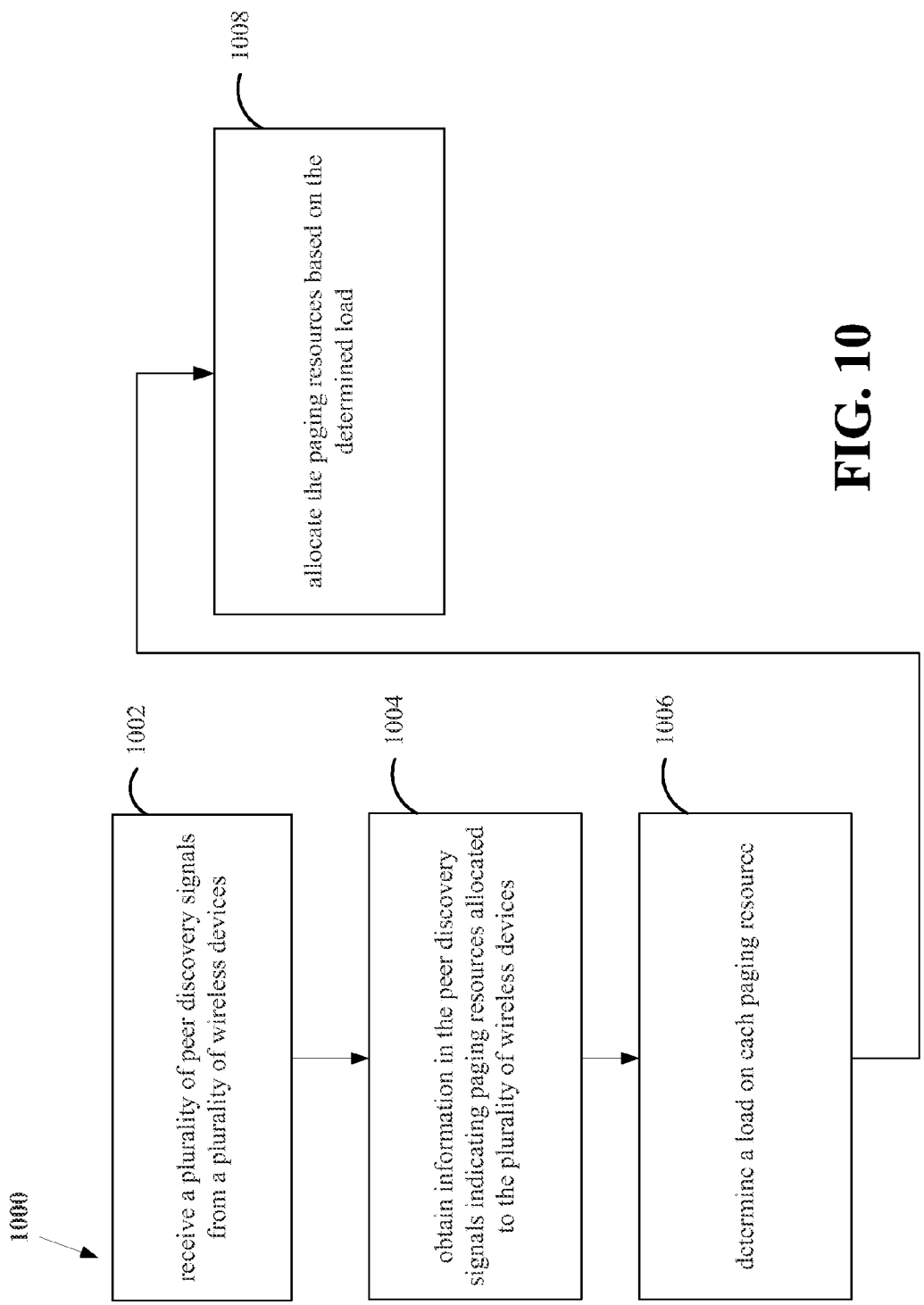
FIG. 10 is another flow chart of a method of wireless communication.

FIG. 10 is another flow chart 1000 of a method of wireless communication. The method may be performed by a wireless device, such as the wireless device 502. As discussed supra, the wireless device 502 may determine the allocated paging resources based on the paging resources to which other wireless devices are allocated. As shown in FIG. 10, the wireless device 502 receives a plurality of peer discovery signals from a plurality of wireless devices (1002). The wireless device 502 obtains information in the peer discovery signals indicating paging resources allocated to the plurality of wireless devices (1004). The wireless device 502 determines a load on each paging resource based on the obtained information (1006). The wireless device 502 then allocates the paging resources based on the determined load (1008). By allocated the paging resources based on the determined load, the wireless device 502 balances the load on the paging resources and thereby reduces paging false alarms and misdetections.

Figure 11:
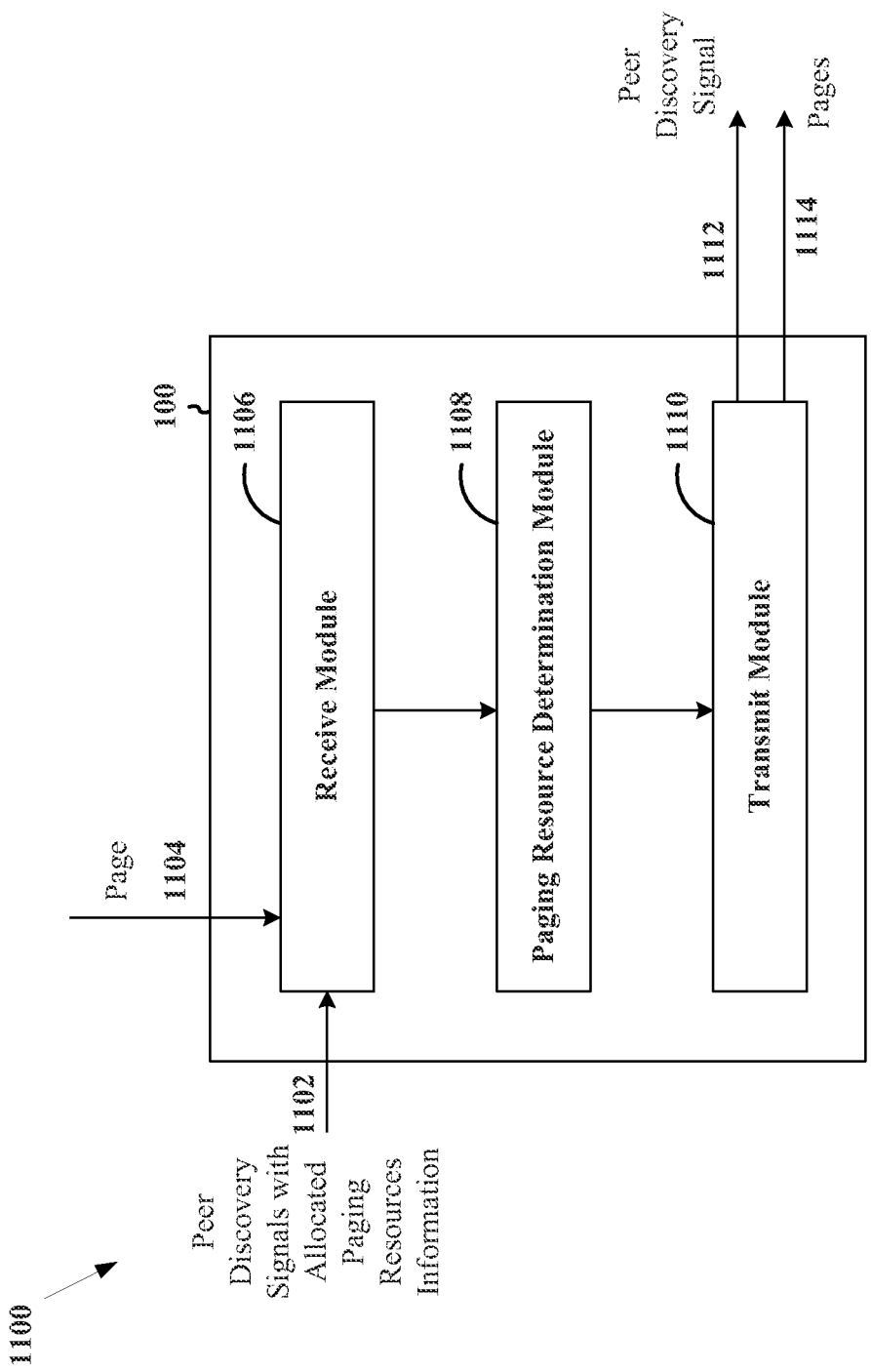
FIG. 11 is a conceptual block diagram illustrating the functionality of an exemplary apparatus.

FIG. 11 is a conceptual block diagram 1100 illustrating the functionality of an exemplary apparatus. The apparatus 100 may include additional modules that perform each of the steps in the aforementioned flow charts. As such, each step in the aforementioned flow charts may be performed by a module and the apparatus 100 may include one or more of those modules. As shown in FIG. 11, the apparatus 100 includes a receive module 1106 that is configured to receive peer discovery signals that include allocated paging resources information 1102. The receive module 1106 is also configured to receive pages 1104 from other wireless devices. The allocated paging resources information is provided to a paging resource determination module 1108 that is configured to determine paging resources of a plurality of paging resources allocated for listening to paging messages. The paging resource determination module 1108 is configured to determine its allocated paging resources based on a traffic type of communication of the apparatus 100, a remaining battery power of the apparatus 100, whether the apparatus 100 is connected to an unlimited power source, a state of the apparatus 100 relative to an environment of the apparatus 100, and/or a load on the paging resources (i.e., paging resources allocated to other wireless devices as provided in the allocated paging resources information 1102). The determined paging resources allocated for listening to paging messages are provided to the transmit module 1110 that is configured to transmit information (e.g., offset, periodicity) indicating the allocated paging resources in a peer discovery signal 1112. The transmit module 1110 is also configured to transmit pages 1114 based on the paging resource allocation information 1102.

Referring to FIG. 1 and FIG. 11, in one configuration, the apparatus 100 for wireless communication includes means for determining paging resources of a plurality of paging resources allocated for listening to paging messages, and means for transmitting information indicating the allocated paging resources in a peer discovery signal. The apparatus 100 may further include means for determining an offset to a particular paging channel and a periodicity of the allocated paging resources. In such a configuration, the transmitted information includes the offset and the periodicity. The apparatus 100 may further include means for receiving a page from a second apparatus in the allocated paging resources in response to the transmitted peer discovery signal. The apparatus 100 may further include means for receiving a peer discovery signal from a second apparatus. In such a configuration, the peer discovery signal includes information indicating paging resources of the plurality of paging resources to which the second apparatus are allocated for listening to paging messages. The apparatus 100 may further include means for paging the second apparatus on resources corresponding to the paging resources allocated to the second apparatus. The apparatus 100 may further include means for receiving a plurality of peer discovery signals from a plurality of wireless devices, means for obtaining information in the peer discovery signals indicating paging resources allocated to the plurality of wireless devices, means for determining a load on each paging resource, and means for allocating the paging resources based on the determined load. The aforementioned means are the modules of FIG. 11 and/or the processing system 114 of FIG. 1 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a first wireless device, comprising:
    determining paging resources allocated for listening to paging messages, the allocated paging resources being a subset of a plurality of paging resources; and
    transmitting information indicating the allocated paging resources in a peer discovery signal.

2. The method of claim 1, wherein the plurality of paging resources include each paging channel of a set of periodic paging channels and the allocated paging resources are in a subset of the paging channels.

3. The method of claim 2, further comprising determining an offset to a particular paging channel and a periodicity of the allocated paging resources, wherein the transmitted information comprises the offset and the periodicity.

4. The method of claim 1, further comprising receiving a page from a second wireless device in the allocated paging resources in response to the transmitted peer discovery signal.

5. The method of claim 1, further comprising receiving a peer discovery signal from a second wireless device, the peer discovery signal including information indicating paging resources of the plurality of paging resources to which the second wireless device are allocated for listening to paging messages.

6. The method of claim 5, further comprising paging the second wireless device on resources corresponding to the paging resources allocated to the second wireless device.

7. The method of claim 5, wherein the determining the allocated paging resources is based on the paging resources to which the second wireless device are allocated.

8. The method of claim 1, wherein the determining the allocated paging resources is based on at least one of a traffic type of communication of the first wireless device, a remaining battery power of the first wireless device, whether the first wireless device is connected to an unlimited power source, or a state of the first wireless device relative to an environment of the first wireless device.

9. The method of claim 8, wherein the state of the first wireless device relative to the environment of the first wireless device comprises one of a velocity, a temperature, a location, acceleration, orientation, humidity, altitude, electromagnetic field, luminosity, audio waves, barometric pressure, pressure, or seismic activity of the first wireless device.

10. The method of claim 1, further comprising:
    receiving a plurality of peer discovery signals from a plurality of wireless devices;
    obtaining information in the peer discovery signals indicating paging resources allocated to the plurality of wireless devices;
    determining a load on each paging resource; and
    allocating the paging resources based on the determined load.

11. An apparatus for wireless communication, comprising:
    means for determining paging resources allocated for listening to paging messages, the allocated paging resources being a subset of a plurality of paging resources; and
    means for transmitting information indicating the allocated paging resources in a peer discovery signal.

12. The apparatus of claim 11, wherein the plurality of paging resources includes each paging channel of a set of periodic paging channels and the allocated paging resources are in a subset of the paging channels.

13. The apparatus of claim 12, further comprising means for determining an offset to a particular paging channel and a periodicity of the allocated paging resources, wherein the transmitted information comprises the offset and the periodicity.

14. The apparatus of claim 11, further comprising means for receiving a page from a second apparatus in the allocated paging resources in response to the transmitted peer discovery signal.

15. The apparatus of claim 11, further comprising means for receiving a peer discovery signal from a second apparatus, the peer discovery signal including information indicating paging resources of the plurality of paging resources to which the second apparatus are allocated for listening to paging messages.

16. The apparatus of claim 15, further comprising means for paging the second apparatus on resources corresponding to the paging resources allocated to the second apparatus.

17. The apparatus of claim 15, wherein the means for determining the allocated paging resources determines the allocated paging resources based on the paging resources to which the second apparatus are allocated.

18. The apparatus of claim 11, wherein the means for determining the allocated paging resources determines the allocated paging resources based on at least one of a traffic type of communication of the apparatus, a remaining battery power of the apparatus, whether the apparatus is connected to an unlimited power source, or a state of the apparatus relative to an environment of the apparatus.

19. The apparatus of claim 18, wherein the state of the apparatus relative to the environment of the apparatus comprises one of a velocity, a temperature, a location, acceleration, orientation, humidity, altitude, electromagnetic field, luminosity, audio waves, barometric pressure, pressure, or seismic activity of the apparatus.

20. The apparatus of claim 11, further comprising:
means for receiving a plurality of peer discovery signals from a plurality of wireless devices;
means for obtaining information in the peer discovery signals indicating paging resources allocated to the plurality of wireless devices;
means for determining a load on each paging resource; and
means for allocating the paging resources based on the determined load.

21. An apparatus for wireless communication, comprising:
a processing system configured to:
determine paging resources allocated for listening to paging messages, the allocated paging resources being a subset of a plurality of paging resources; and
transmit information indicating the allocated paging resources in a peer discovery signal.

22. The apparatus of claim 21, wherein the plurality of paging resources includes each paging channel of a set of periodic paging channels and the allocated paging resources are in a subset of the paging channels.

23. The apparatus of claim 22, wherein the processing system is further configured to determine an offset to a particular paging channel and a periodicity of the allocated paging resources, wherein the transmitted information comprises the offset and the periodicity.

24. The apparatus of claim 21, wherein the processing system is further configured to receive a page from a second apparatus in the allocated paging resources in response to the transmitted peer discovery signal.

25. The apparatus of claim 21, wherein the processing system is further configured to receive a peer discovery signal from a second apparatus, the peer discovery signal including information indicating paging resources of the plurality of paging resources to which the second apparatus are allocated for listening to paging messages.

26. The apparatus of claim 25, wherein the processing system is further configured to page the second apparatus on resources corresponding to the paging resources allocated to the second apparatus.

27. The apparatus of claim 25, wherein the processing system is configured to determine the allocated paging resources based on the paging resources to which the second apparatus are allocated.

28. The apparatus of claim 21, wherein the processing system is configured to determine the allocated paging resources based on at least one of a traffic type of communication of the apparatus, a remaining battery power of the apparatus, whether the apparatus is connected to an unlimited power source, or a state of the apparatus relative to an environment of the apparatus.

29. The apparatus of claim 28, wherein the state of the apparatus relative to the environment of the apparatus comprises one of a velocity, a temperature, a location, acceleration, orientation, humidity, altitude, electromagnetic field, luminosity, audio waves, barometric pressure, pressure, or seismic activity of the apparatus.

30. The apparatus of claim 21, wherein the processing system is further configured to:
receive a plurality of peer discovery signals from a plurality of wireless devices;
obtain information in the peer discovery signals indicating paging resources allocated to the plurality of wireless devices;
determine a load on each paging resource; and
allocate the paging resources based on the determined load.

31. A computer program product in a first wireless device, comprising:
a non-transitory computer-readable medium comprising code for:
determining paging resources allocated for listening to paging messages, the allocated paging resources being a subset of a plurality of paging resources; and
transmitting information indicating the allocated paging resources in a peer discovery signal.

32. The computer program product of claim 31, wherein the plurality of paging resources include each paging channel of a set of periodic paging channels and the allocated paging resources are in a subset of the paging channels.

33. The computer program product of claim 32, wherein the computer-readable medium further comprises code for determining an offset to a particular paging channel and a periodicity of the allocated paging resources, wherein the transmitted information comprises the offset and the periodicity.

34. The computer program product of claim 31, wherein the computer-readable medium further comprises code for receiving a page from a second wireless device in the allocated paging resources in response to the transmitted peer discovery signal.

35. The computer program product of claim 31, wherein the computer-readable medium further comprises code for receiving a peer discovery signal from a second wireless device, the peer discovery signal including information indicating paging resources of the plurality of paging resources to which the second wireless device are allocated for listening to paging messages.

36. The computer program product of claim 35, wherein the computer-readable medium further comprises code for paging the second wireless device on resources corresponding to the paging resources allocated to the second wireless device.

37. The computer program product of claim 35, wherein the code for determining the allocated paging resources determines the allocated paging resources based on the paging resources to which the second wireless device are allocated.

38. The computer program product of claim 31, wherein the code for determining the allocated paging resources determines the allocated paging resources based on at least one of a traffic type of communication of the first wireless device, a remaining battery power of the first wireless device, whether the first wireless device is connected to an unlimited power source, or a state of the first wireless device relative to an environment of the first wireless device.

39. The computer program product of claim 38, wherein the state of the first wireless device relative to the environment of the first wireless device comprises one of a velocity, a temperature, a location, acceleration, orientation, humidity, altitude, electromagnetic field, luminosity, audio waves, barometric pressure, pressure, or seismic activity of the first wireless device.

40. The computer program product of claim 31, wherein the computer-readable medium further comprises code for:
   receiving a plurality of peer discovery signals from a plurality of wireless devices;
   obtaining information in the peer discovery signals indicating paging resources allocated to the plurality of wireless devices;
   determining a load on each paging resource; and
   allocating the paging resources based on the determined load.

\* \* \* \* \*